US006153278A

United States Patent [19]

Timmerman et al.

[11] Patent Number: 6,153,278

[45] Date of Patent: Nov. 28, 2000

[54] PAD OF ADHESIVELY SECURED SHEETS

[75] Inventors: Lee A. Timmerman; Lane Gravley, both of Mankato, Minn.

[73] Assignee: Taylor Corporation, North Mankato, Minn.

[21] Appl. No.: 08/877,252

[22] Filed: Jun. 17, 1997

[51] Int. Cl.[7] .......... B32B 9/06

[52] U.S. Cl. .......... 428/40.1; 428/41.5; 428/42.1; 428/194; 428/201; 428/202

[58] Field of Search .......... 428/40.1, 202, 428/194, 42.1, 41.8, 201, 192, 205, 211, 343, 354, 355 RA; 283/101, 901; 462/18, 21, 25, 26, DIG. 900

[56] References Cited

U.S. PATENT DOCUMENTS

| | | | |
|---|---|---|---|
| 3,691,140 | 9/1972 | Silver | 260/78.5 |
| 3,857,731 | 12/1974 | Merril | 428/314.4 |
| 4,479,838 | 10/1984 | Dunsirn et al. | 156/247 |
| 4,653,666 | 3/1987 | Mertens | 221/45 |
| 4,781,306 | 11/1988 | Smith | 221/33 |
| 4,782,306 | 11/1988 | Smith | 221/33 |
| 5,050,909 | 9/1991 | Mertens et al. | 283/81 |
| 5,080,225 | 1/1992 | Windorski | 221/45 |
| 5,238,720 | 8/1993 | Volkman | 428/40 |
| 5,733,652 | 3/1998 | Stowman et al. | 428/343 |
| 5,755,355 | 5/1998 | Timmerman et al. | 221/33 |

FOREIGN PATENT DOCUMENTS

| | | |
|---|---|---|
| 3836795 | 5/1990 | Germany . |
| 452479 | 5/1968 | Switzerland . |

*Primary Examiner*—Nasser Ahmad
*Assistant Examiner*—Derek Jessen
*Attorney, Agent, or Firm*—Schwegman, Lundberg, Woessner & Kluth, P.A.

[57] ABSTRACT

A pad of paper sheets is constructed so that individual sheets may be removed from the pad without the individual sheets having any aggressively tacky or repositionably tacky coatings on exposed surfaces of the sheets after removal. There is no need for padding compounds or coatings on exterior edges or sides of the pads.

23 Claims, 2 Drawing Sheets

PAD OF ADHESIVELY SECURED SHEETS

BACKGROUND OF THE ART

1. Field of the Invention

The present invention relates to pads of flexible sheets and to a method for making these pads. The invention most particularly relates to stacked, adhered pads of sheets which are adhesively secured to each other but have little or no adhesive property to other surfaces when individual sheets are removed from the pad.

2. Background of the Art

Pads of flexible paper sheets, often called scratch pads or writing pads, have long been available in various numbers of sheets, and in different configurations including rectangular, round, oval, regular, irregular, and other peripheral shapes. The sheets in such pads can, optionally, be printed with lines, pictures, persons, companies or corporations, or which can provide a form to be used by a person or a business.

These pads are often made by forming large master sheets that are either printed or unprinted, assembling the master sheets together into a master pad with a stiff back sheet as the bottom most sheet, cutting a plurality of pads of a desired size from the master pad through the use of a shear or die, and then applying a padding compound (e.g., a water or organic solvent based padding compound or a hot melt adhesive padding compound) along edge surfaces of the pads to secure the individual sheets into a secured pad. Individual sheets can then be removed from the tops of the pads by peeling them away from the padding compound. In some such pads (typically with a large amount of sheets that from a pad generally in the shape of cube ) graphics for purposes such as advertising or decoration are printed along exposed edges of the sheets in the pad and along the padding compound adhering the sheets in the pad together. Such printing will have a different appearance along the padding compound than along the edges of the sheets, which can be undesirable.

Pads of flexible paper sheets having bands of repositionable pressure sensitive adhesive on major surfaces adjacent edges of the sheets that adhere the sheets together in the pads have been available for some time under the trade name "Post-it" (TM) brand notes from Minnesota Mining and Manufacturing Company, St. Paul, Minn. Such pads are available with the bands of repositionable pressure sensitive adhesive along all edges of the sheets which are positioned at one side surface of the stack. Additionally, such pads are available with the band of repositionable pressure sensitive adhesive on each successive sheet in the pad along an opposite side surface of the pad as is taught in U.S. Pat. No. 4,781,306 (Smith). This latter pad structure facilitates dispensing of the sheets of such pads from dispensers of the types described in U.S. Pat. No. 4,781,306 (Smith), U.S. Pat. No. 4,653,666 (Mertens), and U.S. Pat. No. 5,080,255 (Windorski). Pads of either of those types can have graphics printed on the edges of the sheets along all of their side surfaces and those graphics can have a similar appearance on all sides of the pad. Providing the band of repositionable pressure sensitive adhesive on the sheets in such a pad adds expense to the pad, however, and for some purposes that band of repositionable pressure sensitive adhesive on sheets removed from the pad is not needed, or can even be undesirable. For example, when notes are to be written on sheets and carried in a pocket or wallet, the repositionable pressure sensitive adhesive, and especially a stronger pressure sensitive adhesive, causes the sheet to adhere to surfaces or pick up stray matter and become dirty.

BRIEF DESCRIPTION OF THE INVENTION

The present invention comprises both an article and a process for making such articles. The process for forming a pad of sheets which can be separated into individual sheets having no aggressively tacky surfaces comprises the steps of:

a) applying a coating of adhesive to a surface of a first sheet of paper, causing a first bond strength between said adhesive and said surface, and leaving an unbonded surface of adhesive exposed away from said paper, b) for a measurable period of time allowing said adhesive to alter its physical properties so that its tackiness on its unbonded surface decreases, c) contacting a second sheet of paper to said unbonded surface to bond said unbonded surface to said second sheet of paper, the bond between said second sheet of paper and the adhesive having a bond strength which is at least 10% lower than the bond strength between said adhesive and said first sheet of paper, d) repeating steps a), b) and c) on said second sheet of paper to create a stack of sheets which are individually separable from each other.

The articles of the present invention include:

1) a pad comprising a multiplicity of paper sheets having adjacent first sheets and second sheets adhered to each other along only a portion of faces of the first sheets and second sheets which contact each other within the pad,
   said first sheets and second sheets being adhered to each other over an area comprising an adhesive on the surface of a first sheet having a first bond strength to said first sheet and a second bond strength to said second sheet,
   said first bond strength being at least 10% greater than said second bond strength, and 2) a pad comprising a multiplicity of paper sheets having adjacent sheets adhered to each other along only a portion of faces of the sheets which contact each other within the pad,
   said sheets being adhered to each other over an area comprising an adhesive on the surface of one of the adjacent sheets and a release coating on a surface of a sheet in contact with the surface of the sheet having the adhesive thereon. It is preferred that the release coating comprises a varnish, preferably a varnish containing hydrophobic functionality, and especially a UV curable varnish having hydrophobic siloxane groups therein.

DETAILED DESCRIPTION OF THE INVENTION

Figure 1:
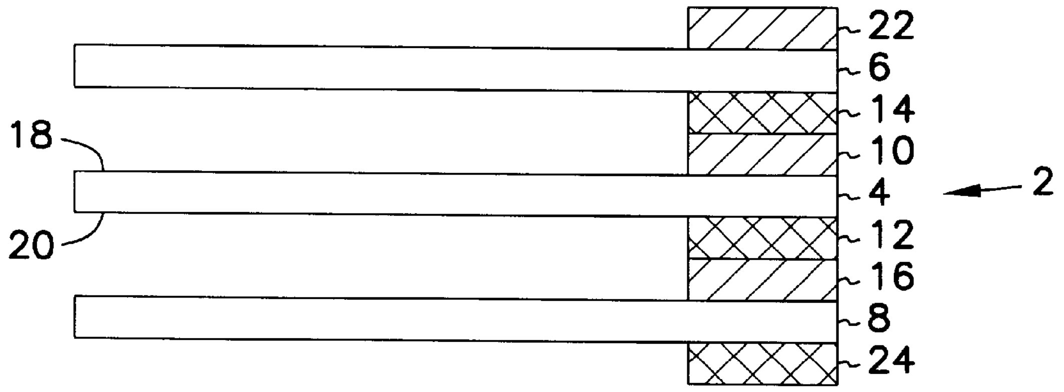
FIG. 1 shows a side view of a pad according to the present invention with all adhesive connections between sheets on a single side of the sheets of the pad.

The present invention provides a pad of flexible paper sheets which, like the prior art pads described above that are formed using padding compound, is inexpensive to make and can have individual sheets removed from the pad that do not bear bands of adhesive that will adhere to most common surfaces. The pads and sheets of the present invention, unlike those prior art pads described above can, if desired, be printed on all sides of the stack to provide a uniform appearance on each of those sides, and can also be adapted to be dispensed from many various dispensers including cardboard box dispensers, other dispensers utilizing an attached sheet follow through, or systems such as those described in U.S. Pat. No. 4,781,306 (Smith), U.S. Pat. No. 4,653,666 (Mertens), and U.S. Pat. No. 5,080,255 (Windorski).

According to the present invention there is provided a pad including a stack of flexible paper sheets, and a padding means which does not completely overcoat an exterior edge of the pad, the padding means releasably adhering parts of the major surfaces of adjacent sheets in the stack together until individual sheets are pealed away from the pad. That padding means comprises at least some of the sheets having patterns of a non-tacky adhesive, especially a cold foil adhesive (as described herein) coated on the major surfaces of the sheets and preferably the adhesive is optionally adhered to patterns of a release layer, such as a varnish layer, on opposed faces of adjacent sheets in the stack to releasable adhere parts of the major surfaces of those adjacent sheets together in surface to surface relationship until these patterns are peeled apart. The pads without an opposed coating of release layer would comprise an adhesive (which is non-tacky when dried or cured) which is applied in a manner so that the adhesive is more securely adhered to one opposed sheet within the pad than to another opposed sheet within the pad. Ordinarily, to simplify manufacturing, the non-tacky when dried adhesive layer will be secured to sheets so that a single sheet will have only one adhesive layer more securely adhered to it with respect to two adjacent sheets. It is feasible, however, to have a single sheet with both adjacent layers of adhesive more securely affixed to that single sheet than to either of the two adjacent paper sheets in the pad.

The preferred materials for use as the respective layers comprise paper varnishes as the release layer, particularly varnishes having a hydrophobic functionality included within the composition, such as a silicone resin or silicone block or graft functionality within the polymer, and cold foil adhesives as the adhesive material. Cold foil or cold transfer adhesives are materials known within the art, particularly within the flexographic printing art, which is coated out as a wet layer and is dried or cured to a non-tacky state, but which retains a controllable degree of tack during the drying or curing stage. It is described in the flexographic art as particularly useful for the transfer of foils.

Thus, while opposing patterns of cold foil adhesive and varnish can adhere sheets in the pad together, those patterns of cold foil adhesive and varnish will not individually adhere to most other surfaces, so that the sheets will not become adhered to most surfaces after they are removed from the pad.

The patterns of cold foil adhesive and release layer (e.g., a U.V. varnish) could be in many different shapes, including areas of adhesive at the centers of the sheets that could be any shape such as circular, rectangular, etc., and are particularly useful when applied as narrow stripes or bands (1 to 20 mm wide). Some or all of the sheets in the pad, such as those sheets that have separable sheets attached to both major surfaces of the sheets, can each have a first band or stripe of cold foil adhesive on a first major surface and can have a second band of release coating, such as an U.V. varnish on a second major surface, with both bands being adjacent the same edge. This can provide the most common form of pad in which all sheets are bound into the pad along the same side or edge of the major surfaces of the pad.

A fundamental aspect of the present invention is to provide a stack of individual sheets which are not aggressively tacky, and that are not pressure-sensitive when removed from the stack. Each individual sheet within the stack is adhered to each of the two sheets which are adjacent to each individual sheet (the top and bottom sheets, of course, not having two adjacent sheets, but only a single adjacent sheet). An adhesive connection is present between individual sheets and the adjacent sheets, the adhesive connection or bond between the sheets being effected through an adhesive, preferably a cold foil adhesive on a major surface of one of the individual sheets and a release coating, preferably a varnish (preferably a radiation cured varnish, most preferably a UV radiation cured varnish) on a major surface of an adjacent sheet. At least some of the area of the two coatings, the cold foil adhesive and the varnish are present on areas of the majors surface which directly oppose each other so that varnish on one major surface of a sheet is in contact with cold foil adhesive on a major surface of an adjacent sheet. Contact between the cold foil adhesive on one major surface of a sheet which bonds or secures that sheet to an adjacent sheet through overlapping contact with a varnish coating on an adjacent sheet is termed adhesive contact or adhesive bonding in the practice of the present invention. The areas of coating of the two different coating materials on the opposed surfaces may be identical in size and shape or may be extremely different, then physical requirement being only that there is sufficient overlap in the contact area between the two coatings on the opposed surfaces to provide adhesive bonding between the two adjacent sheets. The size and shape of the two different coatings may be perfectly mated to each with identical shapes, or may overlap along a line, or may have regions of overlap in various portions of their shape, but the preferred configuration is to have the size and shape of the coatings nearly the same (e.g., no more than a twenty-five percent difference in the total area of the coatings) to maximize the efficiency of the coating and bonding. In any event, there must be a sufficient overlap in the contacting areas of these coatings to provide adhesion between the two adjacent sheets.

The areas where the varnish on one major surface of a first sheet of a pair of adjacent sheets is in adhesive contact with an area of one major surface of the other sheet of a pair of adjacent sheets is referred to as the mated area. The two opposed sheets which are secured or bonded together by the mated area are referred to as the mated sheets. Where there are stacks of sheets, as in the practice of the present invention in forming pads of these sheets, excepting the top and bottom sheet, each sheet in the pad is mated to two different adjacent sheets, one relatively above the sheet within the pad and the other relatively below the sheet within the pad. The middle sheet in such consecutive pairs of sheets is referred to as the center sheet in the consecutive pairs of sheets, and the remaining mated sheets within the consecutive pairs of sheets are referred to as the upper sheet and lower sheet of the consecutive pair, depending upon the orientation of the pad. A consecutive pair(s) of sheets therefore comprises three consecutive sheets, with the center sheet being mated to both the upper and lower sheet.

The compositions and materials used in the practice of the present invention may be selected from a wide array of commercially available materials or may be individually tailored for specific pads by a user. For example, the paper stock most preferred in the practice of the present invention comprises 40 pound (18.2 kg) offset paper stock, but materials comprising 8 pound (3.6 kg) to 200 pound 90.1 kg) stock may be used, and even materials outside that general range are contemplated. The paper stock may be raw stock, single-side coated (one side coated) paper or double-side coated (two side coated) paper. The paper may be preprinted or not with indicia, alphanumerics or art work. The practice of the present invention may be used with sheet surfaces other than paper, such as polymeric film, composite, foil, or the like, as long as the sheet is somewhat flexible.

The adhesive may be selected from a wide array of chemical classes as long as certain minimal functional capabilities are met. The function of the adhesive is to adhere sheets of flexible paper together to form what is commonly called a note pad. The adhesive should remain moist, for a defined and preferably short period of time (less than one minute after coating, and as little as less than five seconds), on each sheet of paper as they are stacked on top of each adjacent sheet of paper forming the note pad, allowing bonding to the paper sheet below. Once the adhesive has dried, it will no longer be tacky, but will keep the stack of sheets in note pad form until each sheet is removed from the pad. Removal of the individual sheets is accomplished by breaking the adhesive bond (usually adhesive breakage as opposed to cohesive breakage), with the adhesive remaining on one of the surfaces of paper which have been separated, but no longer retaining any aggressively adhesive property. It is also desirable that the adhesive be selected so that it may be printed or written upon by inks with equal facility as the uncoated areas of the paper sheets. For example, the adhesive may be an acrylic (including methacrylic, acrylamide, etc.), polyurethane, polyamide, vinyl (e.g., polyvinyl chloride, polyvinylidene chloride, polyvinyl acetate, polyvinyl acetal, etc.), polyolefin, epoxy resin, and the like, as long as the adhesive can be formulated to be tacky initially, and then becomes non-tacky after a drying/curing period. The non-tacky state may be attained by simple drying of the adhesive, by room temperature curing of the adhesive, photoinitiation of the adhesive (for immediate or delayed cure of the adhesive), or any other mechanism which allows the adhesive to be coated while in a tacky or bonding state and then which allows the adhesive to pass into a non-tacky state so that upon separation of the sheets from the pad there is no aggressive tackiness in the adhesive layer. A particular industry recognized class of adhesives, cold foil adhesives or cold transfer adhesives, is particularly suitable for the performance of this adhesive in the practice of the present invention. An example of this type of adhesive is Adhesion Systems, Inc. AS 1545-49A Cold Transfer Adhesive, which is a modified acrylic copolymer aqueous based adhesive solution having 57% by weight solids and a viscosity of 800–1000 cps RV 2/20 r.p.m. at 25° C. Adhesives may even be used in a manner which can reduce or eliminate the need for the release coating on the opposed surface of an adjacent sheet. One way in which this may be accomplished is that the degree of adhesion of the adhesive to the adjacent sheets is controlled so that the adhesion is greater to one of the sheets to the other. In this manner, the sheets will separate by adhesive failure along the interface of the adhesive and the sheet to which it is less strongly bonded. This differential in bonding strength can be achieved by the release coating, or by controlling the adhesion strength of the coating to the respective sheets. This may be accomplished in at least two different ways. If the initial adhesive coating has its thickness controlled, upon application of the coating to one sheet, there will be a desired level of penetration of the adhesive into the surface of the sheet. If the adhesive coating is within a range of thin coating utility, there will not be sufficient adhesive to significantly penetrate the opposed sheet when placed into contact with the adhesive layer. There would be only a weaker adherence of the second sheet to the adhesive layer in comparison to the adherence to the first sheet onto which the original coating was applied. Another method for avoiding the application of a release coating onto a surface is to apply the adhesive to a first sheet, allow or cause the adhesive to dry or cure, and at a point in the drying/curing process where some lessened degree of tack remains in the adhesive coating, placing the next sheet of paper into contact with the adhesive to create a bond strength with the second sheet which is a lower strength bond than that achieved with the first sheet. The delay between application of the adhesive coating and contact with the second sheet could be enough to allow some drying of the layer, or where initiation of adhesive cure can be started by controlled mechanism (e.g., blending in an initiator, thermally activating an initiator, radiation initiating the activator, as with an epoxy triphenylsulfonium tetrafluoroborate system, etc.), initiation can be started and sufficient time allowed for the initiation to partially cure or harden the adhesive with the second sheet contacted with the adhesive only after sufficient cure has occurred to create a weaker bond with the second sheet than with the first sheet. There should be at least 10%, more preferably at least 25%, still more preferably at least 40%, and most preferably at least 50% or at least 75% difference in adhesive bond strength, e.g., as measured by a Testing Machine Incorporated (TMI) peel tester moving at no more than 12 inches per minute at room temperature after fifteen minutes equilibration at room temperature and ambient humidity (e.g., 50% relative humidity) between the adhesion of the adhesive layer to the first sheet than the adhesion of the adhesive layer to the second sheet.

A pad may be manufactured which comprises a multiplicity of paper sheets having adjacent first sheets and second sheets adhered to each other along only a portion of faces of the first sheets and second sheets which contact each other within the pad. The first sheets and second sheets are adhered to each other over an area comprising an adhesive on the surface of a first sheet having a first bond strength to the first sheet and a second bond strength to the second sheet, the first bond strength being at least 10% greater than the second bond strength. The pad is able to be constructed where all faces of said paper sheets have the same coating surface thereon (e.g., all two-side coated papers, all raw stock, all papers without release layers, etc.), and no pad forming coatings are present on the paper sheets. The pad may have all faces of the paper sheets with the same coated paper coating surface thereon, and there may be no pad forming coatings are present on the paper sheets. As noted above, there may be no release coatings are present on surfaces of the sheets of paper.

The release coating layer may be any of the well known release coating materials recognized in the art. There are two desirable contributions by the release coat. First, it creates a protective coating on each sheet of paper to which it is applied to prevent any opposing adhesive from bonding too strongly to the paper coated by the release coat, which could make separation difficult and/or cause fibers and printing to be removed from the paper sheets as it is separated from the pad. Additionally, the release coat helps to control the sheet removal forces required for the removal of the individual sheets from the note pad. The amount and specific properties of the release coat can be used for this control. For example, a 100% (continuous coating) coating stripe would provide a much easier release than a strip of release layer printed as 10% dots or any other intermediate value (e.g., 20% or 40% dots or even discontinuous lines of coating) of screened coating. These release coating materials may comprise silicone or fluorinated resins, for example, or resins modified to contain silicon or fluorinated groups, or containing silicone or fluorinated oils or blends of silicone polymers or fluorinated polymers to alter their surface adhesion properties. These types of resins are well known in the art and may be used for example on back side coatings for rolls of adhesive faced sheets, release surfaces in imaging layers (especially in transfer imaging), and the like. For example, Gnereal Electric Company, Waterford, N.Y. 12188 provides a wide array of silicone resins and oils in the GE Silicones unit which are suitable for this type of purpose. These silicone resins come in a wide range of properties an capabilities, including solventless systems, UV curable systems, emulsions and solvent systems for application to various substrates and for providing various specific properties. Such resins include, but are not limited to SL6000, SL6100 and SL6130 Solventless Release Coating Systems, UV9300, UV 9315 and UV 9400 Solventless UV Release Polymers, and SM3000, SM 3200 and SM2013 Release Coatings, SS4191A, SS4331 Release Coating Systems and SS4375 Premium Release Coatings. Other release compositions containing low adhesion materials such as fluorinated resins or fluorinated groups, highly crosslinked materials, and the like may also be used to create a release or low adhesion layer opposed to the adhesive. Particulate materials may be included in the adhesive or the release coating layer to further adjust the degree of adhesion between the two layers. Varnishes, as used in the paper industry, especially varnishes containing silicon or silicone materials are generally preferred in the practice of the present invention, and an example of the most preferred materials being Wemeke Co. (Plymouth, Minn.) UCCXX0038 (UV-20003) Matte Abrasion Resistant coating composition which is an ultraviolet radiation curable silicone-containing composition having a viscosity of 350±50 cps at 25° C.

The construction of the consecutive pairs within the pads of the present invention is formatted to provide areas of varnish on one major surface of a sheet within the pair which are opposed to and in contact with areas of cold foil adhesive on a major face of an adjacent sheet within the consecutive pair of sheets. There are numerous configurations which are able to provide this requirement. The simplest construction may be seen in FIG. 1. In this construction, a pad 2 of individual sheets 4, 6 and 8 are shown. The center sheet 4 has a cold foil adhesive coating 12 on one major surface 20 of the sheet 4 and a varnish coating 10 on the other major surface 18 of the center sheet 4. The cold foil adhesive coating 12 of the center sheet 4 is mated and releasably bonded to a varnish coating 16 on the lower sheet 8, and the varnish coating 10 of the center sheet 4 is mated and releasably bonded to a cold foil adhesive coating 14 on the upper sheet 6. The figure shows that the upper sheet 6 has an unmated release coating layer 22 and the lower sheet 8 has an unmated adhesive layer 24. This layer 22 is not necessary, but tend to be artifacts of manufacturing processes in which the same direction-facing sides of individual sheets are all coated with the same coating material when stacked. Layer 24 may be a necessary artifact of the manufacturing process where it is used to bond to a corresponding adhesive layer on the back sheet.

A back sheet is usually a sheet of material, of the same or different type than the paper sheets, which is used to show the end of the stack, differentiate from the front of the stack, and/or support the stack. It may be paper, paper board, plastic, fabric, composite, metal, etc., and may adhesive and/or release systems of the present invention, could form the pads with back sheets inserted dueling the manufacturing process.

Figure 2:
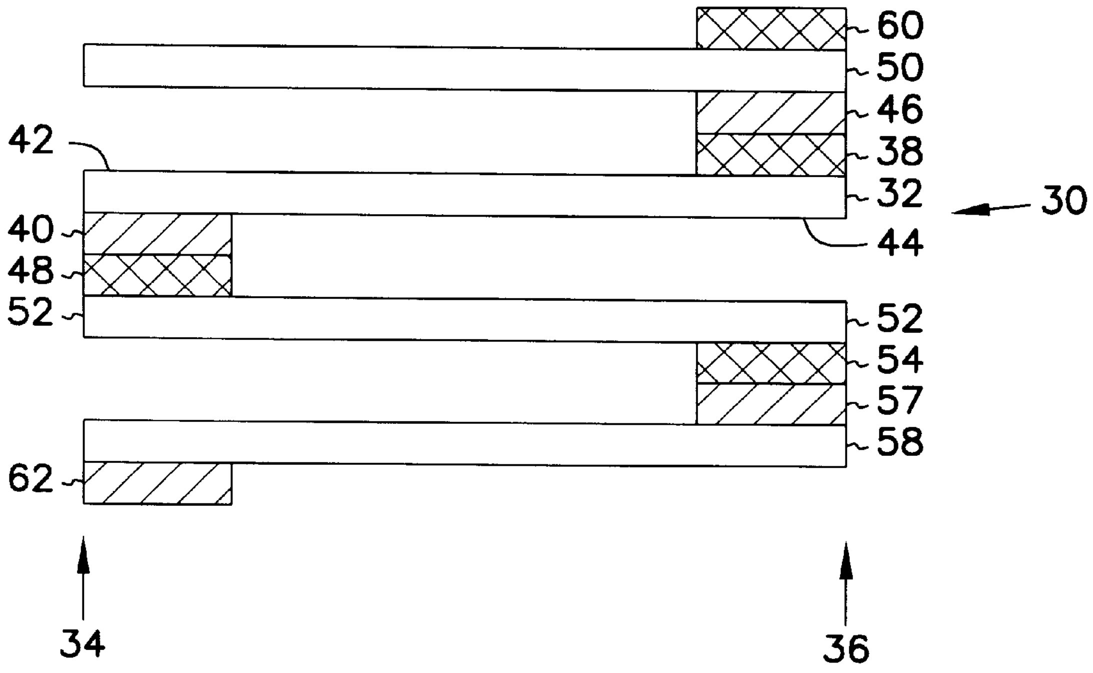
FIG. 2 shows a side view of a pad according to the present invention with alternating adhesive connections on opposite sides of alternative sheets in the pad, forming a Z-fold distribution of sheets within the pad.

FIG. 2 shows an alternative configuration of sheets within a pad according to the practice of the present invention. FIG. 2 shows a pad 30 comprising four individual sheets, a center sheet 32, and upper sheet 50, a lower sheet 52, and an additional sheet 58 which is not included with the consecutive pairs of sheets formed by sheets 32, 50 and 52. Center sheet 32 has a coating of cold foil adhesive 40 and a coating of varnish 38 on major faces 44 and 42 respectively. The cold foil adhesive coating 40 is adhesively bonded and mated to varnish coating 48 which is coated onto lower sheet 52 on the relatively left side 34 of the pad 30. The varnish coating 38 is adhesively bonded and mated to cold foil adhesive coating 46 which is coated onto center sheet 32 on the relatively right side 36 of the pad 30. On the relatively right side 36 of the pad 30, sheet 52 is then bonded to sheet 58 through varnish coat 54 and adhesive layer 56. This alternating orientation of consecutive matings of varnish and adhesive coatings on sheets within the pad 30 provides what is known in the art as a Z-fold pad structure. In this type of structure, as each sheet is lifted, the next sheet will be angled in a direction with respect to the horizon which is different from the preceding sheet. When a number of sheets are lifted and supported without separation, they appear to be a continuous configuration of Z shapes, hence the name for the configuration. In FIG. 2, the upper sheet 50 is shown with a vestigial release coating 60 (on a major surface of upper sheet 50 opposite adhesive layer 46) and the lowermost sheet 58 is shown with a vestigial adhesive coating 62 as a residue from the coating and stacking process used in manufacture of the pad. Layer 60 is optional, and layer 62 is necessary where there will be bonding a backsheet to the adhesive layer 62.

Figure 3:
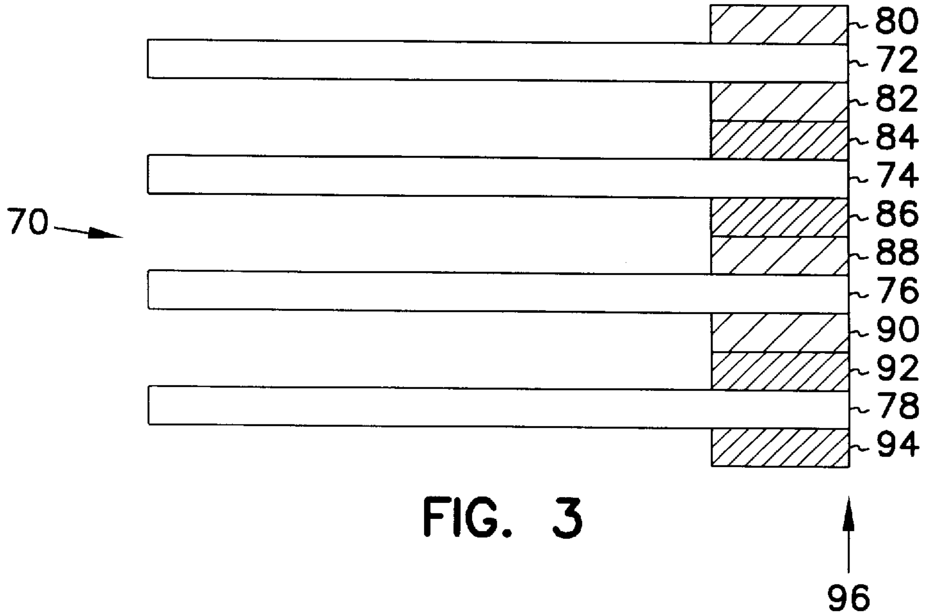
FIG. 3 shows a side view of a pad according to the present invention with an alternative distribution of adhesive and varnish from the construction shown in FIG. 1.

FIG. 3 shows that the configuration and respective ordering of cold foil adhesive layers and varnish layers may be varied in the practice of the present invention. For example, the pad 70 shown in FIG. 3 has four individual sheets 72, 74, 76 and 78 within the pad 70. The uppermost sheet 72 has both major surfaces coated with varnish coatings 80, 82. The lower adjacent sheet 74 has both of its major surfaces coated with cold foil adhesive layers 84, 86, all of these layers process used in manufacture of the pad. Layer 60 is optional, and layer 62 is necessary where there will be bonding a backsheet to the adhesive layer 62.

FIG. 3 shows that the configuration and respective ordering of cold foil adhesive layers and varnish layers may be varied in the practice of the present invention. For example, the pad 70 shown in FIG. 3 has four individual sheets 72, 74, 76 and 78 within the pad 70. The uppermost sheet 72 has both major surfaces coated with varnish coatings 80, 82. The lower adjacent sheet 74 has both of its major surfaces coated with cold foil adhesive layers 84, 86, all of these layers being along the relatively right side 96 of the pad 70. In continuing orientation, the next lower sheet 76 has both of its major surfaces coated with varnish coatings 88,90, and the lowest sheet 78 shown in the pad 70 has cold foil adhesive layers 92, 94 on both of its major surfaces. This configuration provides the necessary relationship of varnish coatings on one sheet being in contact with cold foil adhesive coatings on adjacent sheets. The same type of variation which is shown in the relationship of the structure of the pads of FIGS. 1 and 3 may also be used in construction an alternative configuration for the structure of the Z-fold pad shown in FIG. 2. Each coating on upper sheet 4 could be varnish coatings, each coating on center sheet 32 could be cold foil adhesive coatings, and both coatings on lower sheet 52 could be varnish coatings and the same type of results achieved.

Figure 4:
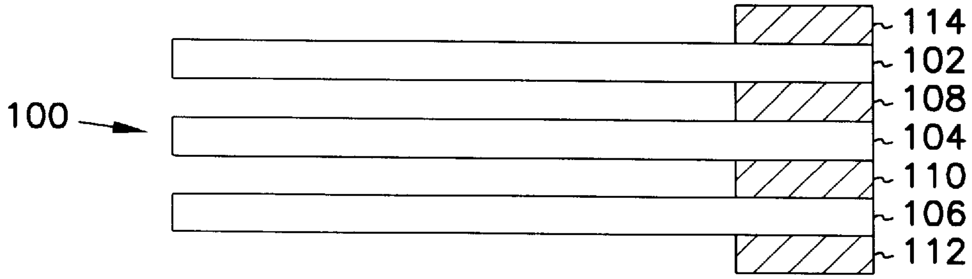
FIG. 4 shows a side view of a pad according to the present invention with only adhesive layers between adjacent sheets of paper within the pad.

FIG. 4 shows a pad 100 having three sheets of paper 102, 104 and 106 joined by two adhesive layers 108 and 110 with an exterior adhesive layer 112. No release layer is needed in this construction because of the differentiation in adhesive strength between adhesive layers and the respective paper sheets to which they are attached. Layer 104 is a non-essential residue of the manufacturing process.

Figure 5:
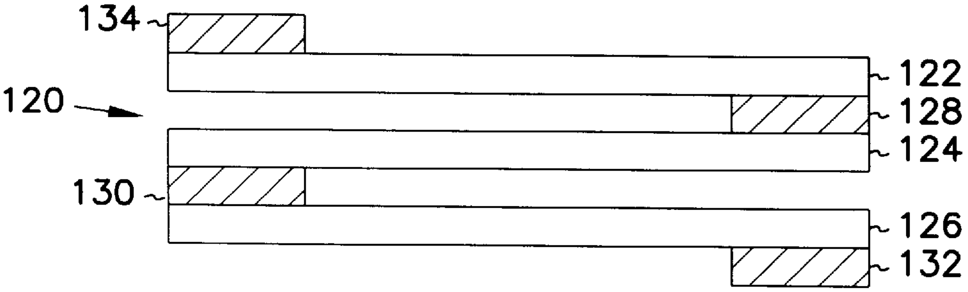
FIG. 5 shows a side view of a Z-fold pad according to the present invention with only adhesive layers between adjacent sheets of paper within the pad.

FIG. 5 shows a Z-fold pad 120 of paper sheets 122, 124 and 126 which are secured at opposite ends by adhesive layers 128 and 130, with an exterior adhesive layer 132. As with FIG. 4, no release layer is needed in this construction because of the differentiation in adhesive strength between adhesive layers and the respective paper sheets to which they are attached. Layer 134 is a non-essential residue of the manufacturing process.

Any such type of pad according to the present invention has a plurality of side surfaces defined by the edges of the sheets. If there are a large number of sheets in the pad, each of those side surfaces can have graphics printed on the edges of the sheets so that all of the side surfaces of the pad can look similar, which, for example, is desirable in a pad in the shape of a cube used for advertising purposes. Some major surfaces of the sheets or portions of the major surfaces may also having printing thereon.

There are two equally preferred processes for producing the product of the present invention. The first process Web lithographic or web flexographic printing, and the second process is sheet fed offset or flexographic printing. In web litho and flexo printing, the paper may be provided and then in roll form, is fed into the printing stations, then into a common (flexo) coating unit and then followed by a UV light source. After these steps, the web is turned over and fed into a second flexographic coating unit and then into a sheeting station followed by a registered stacker. In the printing units, the desired graphics are printed onto the paper by using either flexographic or lithographic printing. After printing, the ink must be dried by using various equipment of which some might include, hot air, infrared, convection air, infrared heaters, or UV curing.

Next, the UV release coating is applied, using the flexographic coating unit. The release coating is either pumped into a common enclosed doctor blade system or carried from a pan to an anilox or gravure roll, which then applies the release coating to a flexographic plate. The anilox or gravure roll can vary in screen count and volume to give variation to the sheet removal force. Also, a doctor blade is useful in metering the precise amount of coating off the anilox or gravure roll.

The flexographic plate then applies the release coating to the paper in register with the adhesive. The image on the flexographic plate can vary dramatically from continuous stripes to circles or squares, to compete or partial coverage and so on. Also, the flexographic plate can vary in the amount of volume it carries, from very light screens to solid coverage. This allows flexibility in the sheet removal force. This release coating is applied to the first major surface of the sheet. The release coating then is immediately cured by using a UV light source. The UV light can vary from 1–300 watt per inch lamp to as many as 3–800 watt per inch lamps depending on the speed of the press. The most common light source will be 2–600 watt per inch lamps. The lamps normally span a distance of 12–24 inches, but can range from 6 inches to 60 feet. The duration of time during which the coating is cured depends on lamp size and the speed of the press. Duration time is a non-critical issue, as long as the release coating is approximately 100% cured (or at least sufficiently cured to provide the desired properties). Following the curing of the release coating, the web is turned over and directed into another flexographic coating unit where the adhesive is applied. The adhesive is applied in much the same way as was the release coating. It is pumped into an enclosed doctor blade system or carried from a pan to the anilox roll. Again, the anilox roll can vary in screen count and volume depending on the desired amount of adhesive. After metering the adhesive with a doctor blade, the adhesive is carried to the flexo plate, which then applies the adhesive to the paper on the second major surface. The image on the flexo plate can vary in size, shape and volume, such as using a full coverage stripe, circle, square, or by using different screen percentages. An example would be using a 10% screen to minimize the amount of adhesive applied. These are only examples, as there are obviously a wide range of possibilities. After the adhesive is applied in register onto the paper, the web is directed into the sheeter/stacker unit. The sheeter has a rotary knife that cuts the web into sheets of a desired size and then carries the cut sheets on a belt system into the stacker unit to be stacked in register to each other. The adhesive is only partially dry at this point in the process and final curing or drying is completed in a stacked pile over the course of one to 4 days.

Additionally, a backsheet may be inserted into the stack of sheets at chosen intervals, which intervals can vary by changing the batch count on the automated backsheet inserter. The backsheet is a precoated thicker sheet of paper, meaning that it has been previously coated with a release coating and adhesive. A greater amount of adhesive and release coating is generally applied to the backsheet which will allow for better adhesion to the sheet to which it is contacted and to allow better slip between each backsheet as they are stacked together before insertion into the stack of sheets. The backsheet may be produced with the same process as is described above.

The stack will continue to build, and backsheets will continue to be inserted at chosen intervals, making what are referred to as master pads. A master pad can have several note pads within itself. The master pads are taken to a common guillotine cutter and cut into individual note pads which can vary in shape and size. At this point, the note pads can be die cut usually with a common pad diecutter or packed for shipping. Note that the master pads must usually dry for a minimum of 16 hours before being cut down. The adhesive will remain wet to some degree for an undetermined amount of time. When cutting down on the guillotine cutter, one can vary the back gauge pressure from 500 to 5500 psi. The more pressure applied, the stronger the bond of the finished note pad and the stronger the sheet removal force.

The second process method involves sheeted litho (lithographic) or flexo (flexographic) printing. This process is similar to the web printing process, only it is most commonly done in several steps. First, a pre-cut stack of sheets is set into a common sheeted stacker and fed into the printing press one at a time to print the desired graphics. After the graphics have been printed, the sheet is then fed into a stacker and stacked into piles of paper. Next, the printed stack is fed into a sheet fed flexo coater unit which applies the release coating in the same basic process as it was applied on the web press. The coating station could be in line with the printing press or a completely different unit. The release coating is applied to the first major surface. The printed and coated sheet is then fed into a second coater unit where the adhesive is applied. This adhesive is applied to the second major surface and is applied in the same manner as the web process. As the finished product is sent into the stacker, backsheets will be sent into the stack at chosen intervals. These backsheets are produced in a similar manner as described in the web process.

In addition, another process can be used in place of the process just described. If a lower cost note pad is desired, one can manufacture this product without applying the release coating. The quality is lower, as more paper fibers are exposed to the adhesive, and the sheet removal force is generally more aggressive. The process would be the same as above, except one would eliminate the release coating part of the process. Also, the adhesive pattern on the flexo plate, in this secondary process, can have several different shapes, sizes and screens to achieve varying degrees of sheet removal force. The product can be made using either the web process or the sheet fed process. The increased sheet removal force will pick more paper fibers, delaminate some small parts of the printed image and induce sheet curl as the sheets are pulled off the stack. Additives in the ink can reduce these attributes if the printed image area corresponds in a direct relationship with the applied adhesive.

In describing the structure of the pads of the invention, the term outside edge is used to describe the actual edge of the sheets of paper where padding material is ordinarily applied. The term inner edge is used to define a portion of the major surfaces of the sheets extending from the outside edge along a major surface of a sheet. This inner edge is the region where the major portion of adhesive tends to be applied as opposed to the outside edge of the sheets. The inner edge or the adhesive on the inner edge need not actually contact the outer edge of the sheets, but may be disposed inwardly on the major surface away from the outside edge.

What is claimed is:

1. A pad comprising a multiplicity of paper sheets having at least three adjacent sheets adhered to each other along only a portion of major surfaces of the sheets which contact each other within the pad, each of said sheets being releasably adhered to each other over a surface of said portion comprising a non-tacky adhesive on the surface of said portion of one of the sheets and a release coating on a surface of said portion of an adjacent sheet in contact with the surface of the sheet having the non-tacky adhesive thereon.

2. The pad of claim 1, wherein said adhering occurs only along inner edges of said sheets, and said non-tacky adhesive comprises a cold foil adhesive.

3. The pad of claim 2 wherein said adhering occurs along all inner edges on a single side of the sheets in said pad and no pad forming coatings are present on sides of said sheets.

4. The pad of claim 3 wherein said cold foil adhesive and said release coating are coated on inner edges of said sheets which share a common inner edge on said pad.

5. The pad of claim 2 wherein said sheets of paper forming said pad have a coating of cold foil adhesive or release coating on one inner edge on one surface of said sheet, and have another coating of either cold foil adhesive or release coating on an opposite inner edge on an opposite side of said sheet so that upon lifting of one sheet, a Z-fold is formed with a next sheet in said pad.

6. The pad of claim 1 wherein said non-tacky adhesive comprises an acrylic cold transfer adhesive.

7. The pad of claim 2 wherein said cold foil adhesive comprises a cold transfer acrylic or vinyl adhesive.

8. A pad comprising a multiplicity of paper sheets having at least three adjacent releasably adhered to each other along only a portion of major surfaces of the sheets which contact each other within the pad, each of said sheets being adhered to the adjacent sheet over a surface of said portion comprising a non-tacky adhesive, said adhesive having a first bond strength to said sheet and a second bond strength to said adjacent sheet, said first bond strength being at least 10% greater than said second bond strength.

9. The pad of claim 8 wherein all faces of said paper sheets have a coating surface, and each coating surface comprises the same coating surface, and no pad forming coatings are present on said paper sheets.

10. The pad of claim 8 wherein all faces of said paper sheets have coated paper coating surfaces and each coated paper coating surface on each paper sheet is the same coated paper coating surface, and no pad forming coatings are present on said paper sheets.

11. The pad of claim 8 wherein no release coatings are present on surfaces of said sheets of paper.

12. The pad of claim 1 wherein at least eight sheets of paper are present in said pad.

13. A pad comprising a multiplicity of paper sheets having at least three adjacent sheets adhered to each other along only a portion of major surfaces of the sheets which contact each other within the pad, each of said sheets being releasably adhered to each other over an area of said portion comprising a non-tacky adhesive on the surface of said portion of one of the sheets, and a release coating on a surface of said portion of an adjacent sheet in contact with the surface of the sheet having the adhesive thereon wherein both the adhesive and the release coating covers only said portion, and the area of adhesive is between 25% less than and 25% greater than the area of an opposed release coating.

14. A pad comprising a multiplicity of paper sheets having at least three adjacent sheets adhered to each other along only a portion of major surfaces of the sheets which contact each other within the pad, said sheets being releasably adhered to each other over an area of said portion comprising a non-tacky adhesive on the surface of said portion of one of the sheets and a release coating on a surface of said portion of an adjacent sheet in contact with the surface of the sheet having the adhesive thereon wherein both the adhesive and the release coating covers only said portion, and the area of adhesive is approximately equal to the area of an opposed release coating.

15. The pad of claim 14 wherein the adhesive and the release coating are in opposed matching shapes with each other.

16. The pad of claim 13 wherein the adhesive is present as a band which is from 1 to 20 millimeters wide.

17. The pad of claim 14 herein the adhesive is present as a band which is from 1 to 20 millimeters wide.

18. The pad of claim 15 wherein the adhesive is present as a band which is from 1 to 20 millimeters wide.

19. The pad of claim 13 wherein said adhesive is a cold foil adhesive.

20. The pad of claim 14 wherein said adhesive is a cold foil adhesive.

21. The pad of claim 15 wherein said adhesive is a cold foil adhesive.

22. The pad of claim 16 wherein said adhesive is a cold foil adhesive.

23. The pad of claim 18 wherein said adhesive is a cold foil adhesive.

* * * * *